United States Patent [19]

Kanamaru

[11] Patent Number: 4,665,442
[45] Date of Patent: May 12, 1987

[54] CROSS-TALK ELIMINATING DEVICE IN INFORMATION-CARRYING DISC PLAYER

[75] Inventor: Hitoshi Kanamaru, Tokorozawa, Japan

[73] Assignee: Pioneer Video Corporation, Tokyo, Japan

[21] Appl. No.: 684,859

[22] Filed: Dec. 21, 1984

Related U.S. Application Data

[63] Continuation-in-part of Ser. No. 377,055, May 11, 1982, abandoned.

[30] Foreign Application Priority Data

May 12, 1981 [JP] Japan .................................. 56-070968

[51] Int. Cl.⁴ ............................................. H04N 5/85
[52] U.S. Cl. ..................................... 358/340; 358/342; 369/44
[58] Field of Search ............... 358/327, 328, 340, 342, 358/907; 369/44, 45, 46, 121, 122, 112, 111

[56] References Cited

U.S. PATENT DOCUMENTS

| | | | |
|---|---|---|---|
| 3,999,008 | 12/1976 | Bouwhuis et al. | 369/45 |
| 4,011,400 | 3/1977 | Simons et al. | 369/46 |
| 4,038,679 | 7/1977 | Bouwhuis et al. | 369/45 |
| 4,065,786 | 12/1977 | Stewart | 369/111 |
| 4,135,206 | 1/1979 | Kleuters et al. | 369/112 |
| 4,236,232 | 11/1980 | Jansen et al. | 369/44 |
| 4,310,912 | 1/1982 | Kikuchi et al. | 369/45 |
| 4,375,091 | 2/1983 | Dakin et al. | 369/44 |
| 4,381,556 | 4/1983 | Bourdon et al. | 369/44 |
| 4,416,002 | 11/1983 | Oguino et al. | 358/342 |

Primary Examiner—Donald McElheny, Jr.
Attorney, Agent, or Firm—Fleit, Jacobson, Cohn & Price

[57] ABSTRACT

An optical information-carrying disc player for reading information recorded on an optical information-carrying disc by means of a pick-up device placed in the proximity of the information-carrying disc which is rotated about the central axis thereof by a disc support means such as turn-table, which features cross-talk eliminating means connected to at least either one of the disc support means and pick-up device, for adjusting the angular position of the pick-up device with respect to the recording surface of the information-carrying disc, thereby to eliminate or suppress the cross-talk.

7 Claims, 28 Drawing Figures

WOBBLING SIG

CROSS-TALK ELIMINATING DEVICE IN INFORMATION-CARRYING DISC PLAYER

This is a continuation-in-part of patent application Ser. No. 377,055, filed May 11, 1982, abandoned.

FIELD OF THE INVENTION

The present invention relates to an optical information-carrying disc player and, in particular, to a cross-talk eliminating device in the optical information-carrying disc player.

BACKGROUND OF THE INVENTION

It is generally a problem in an optical information-carrying disc player that information read from a target track on an optical information-carrying disc contains some components is affected by information recorded on a track neighbouring to the target track, which is so-called cross-talk phenomenon.

It is well known that, in an optical information-carrying disc player, aberration in a reading optical pick-up device, deviation of the optical axis of a reading spot from the rotation axis of the information-carrying disc, etc. causes introduction of aberration into the reading beam so that distortion in configuration of the pick-up spot takes place on the recording surface of the disc, which distortion causes such cross-talk phenomenon as mentioned above.

The above-mentioned deviation of the optical axis of a reading spot emitted from the pick-up device with respect to the rotation axis of the disc may be caused by, for example, deformation either of the information carrying disc to be played or of the chassis supporting the turn-table spindle. Such deformation occurs during usage by users and cannot be eliminated by usual focusing and/or tracking servo controls, so that a cross-talk eliminating device should be provided or equipped with an information-carrying disc player.

SUMMARY OF THE INVENTION

It is accordingly a primary object of the present invention to provide a cross-talk eliminating device to be incorporated in an optical information-carrying disc player, which device adjusts mechanical relation between the pick-up device and the information-carrying disc.

According to the present invention, there is provided an optical information-carrying disc player for reading information recorded on an information-carrying disc by means of a pick-up device placed in the proximity of the information-carrying disc which is rotated about the central axis thereof by a disc support means, which player comprises cross-talk eliminating means connected to at least either one of the disc support means and pick-up device, for adjusting the angular position of the pick-up device with respect to the information-carrying disc.

BRIEF DESCRIPTION OF THE DRAWINGS

The features and advantages of a cross-talk eliminating device according to the present invention will be more clearly understood from the following description taken in conjunction with the accompanying drawings, in which:

FIGS. 6A through 6H are diagrams respectively showing waveforms of signals appearing in the device shown in FIG. 5;

DESCRIPTION OF THE EMBODIMENTS

Figure 1A:
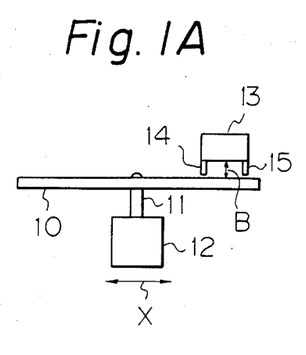
FIGS. 1A and 1B are sketches showing a pick-up assembly and an information-carrying disc mounted on a disc support device, in which the disc support device is movable in a radial direction of the information-carrying disc and a cross-talk eliminating device is connected to the pick-up device.
Figure 1B:
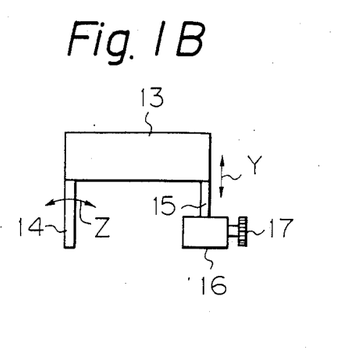

Referring to the drawings, especially to FIGS. 1A and 1B, there is shown an information-carrying disc 10 carrying video, audio or other types of information on the major surface thereof, that is, the recording surface. The information is recorded on the information-carrying disc in the form of one or more spiral or angular tracks. The information-carrying disc 10 is rotatably supported on a spindle 11, or a turn-table, of a disc support assembly 12 which is moveably slideable in a radial direction (X) of the information-carrying disc 10 on a chassis (not shown) of an information-carrying disc player. The disc support assembly 12 includes a spindle motor (not shown) for rotating the spindle 11 at a desired rotational speed. A pick-up assembly or carrier 13 is fixed to the chassis by means of a pair of support columns 14 and 15 so that a pick-up device (not shown) contained in the assembly 13 is placed in the proximity of the information-carrying disc 10 whereby a pick-up spot, such as optical beam (B), of the pick-up device is aligned on a target track on the recording surface of the disc 10. The pick-up assembly 13 is connected by way of the support column 15 to a cross-talk eliminating device 16 which actuates the column 15 in a direction (Y) in response to manual indication by means of a knob or dial 17 so that the pickup assembly 13 swings in either one of such directions as shown by arrows Z, whereby the optical axis of the beam (B) inclines with respect to the rotational axis of the disc 10. The cross-talk eliminating device 16 may be arranged to be automatically operative in response to an electric signal produced from an electric device such as a cross-talk detecting device which will be described in detail hereinafter. Due to the operation of the cross-talk eliminating device 16, the mechanical relation between the pick-up device 13 and the information-carrying disc 10 is regulated or adjusted so that the cross-talk can be eliminated or suppressed.

Figure 2A:
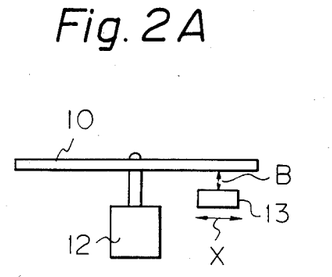
FIGS. 2A and 2B are sketches showing a pick-up assembly and an information-carrying disc mounted on a disc support device, in which the pick-up device is movable in a radial direction of the information-carrying disc and a cross-talk eliminating device is connected to the disc support device.
Figure 2B:
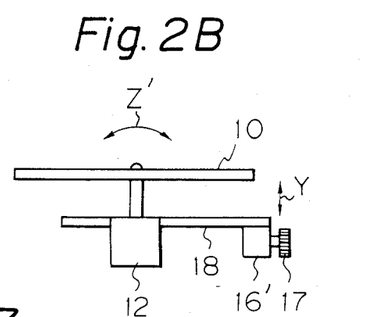

In FIGS. 2A and 2B, there is shown another type of information-carrying disc player in which the disc support assembly 12 is firmly fixed on the chassis and the pick-up assembly 13 is movable in a radial direction (X) of the information-carrying disc 10. The disc support assembly 12 is connected through a swing lever 18 to a cross-talk eliminating device 16' which actuates the lever 18 in response to manual indication by way of a knob or dial 17. The actuation of the lever 18 causes adjustment of the inclination of the rotational axis of the information-carrying disc 10 relative to the pick-up device as shown by arrows Z', so that the cross-talk can be eliminated or suppressed. The cross-talk eliminating device 16' may be arranged to be automatically operative in response to an electric signal from a cross-talk detecting device in a manner similar to the device of FIGS. 1A and 1B.

Figure 3:
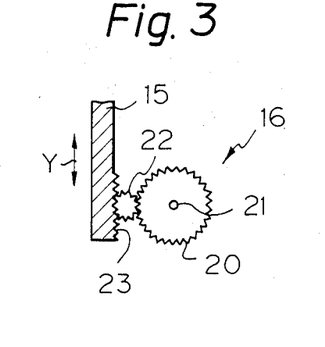
FIG. 3 is a sketch showing an example of the mechanical connection between the cross-talk eliminating device and the pick-up assembly.

In FIG. 3, there is shown an example of the cross-talk eliminating device 16, in which the knob 17 is connected to a gear 20 rotatably mounted on a pin 21. The gear 20 rotates in accordance with rotation of the knob 17. The gear 20 engages by way of a pinion gear 22 to a lack gear 23 formed at a portion of the column 15 so that the column 15 can move in the direction (Y) in accordance with the rotation of the knob 17.

The knob 17 may be manually rotated by an operator while he monitors the read and reproduced information by means of a speaker. However, as mentioned above, the cross-talk eliminating devices 16 or 16' may be preferably automatically actuated by a cross-talk detecting device which produces an electric signal representative of amount and/or direction of the cross-talk.

Figure 4A:
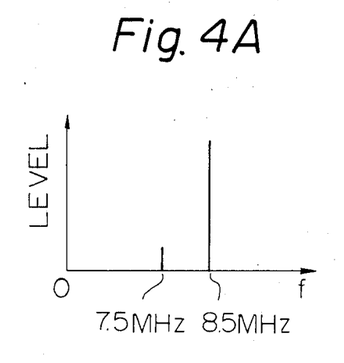
FIG. 4A is a frequency spectrum of a signal demodulated from a modulated carrier signal obtained from a portion of a track on an information-carrying disc.
Figure 4B:
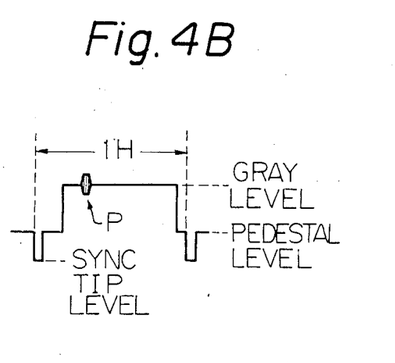
FIG. 4B is a diagram showing a waveform of a video signal having such frequency spectrum shown in FIG. 4A.
Figure 4C:
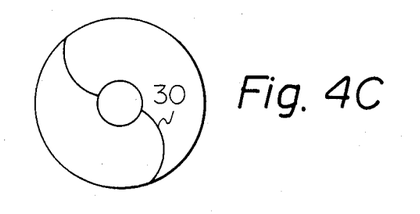
FIG. 4C is a sketch of an information-carrying disc on which information is recorded in the form of one or more tracks at a varying angular velocity such as constant line velocity (CLV)

Referring to FIGS. 4A through 4C, a typical cross-talk phenomenon upon reading of a video information recorded on the information-carrying disc 10 will be discussed in detail hereinbelow. In FIG. 4A, there is shown a frequency spectrum of a recorded signal which is a frequency modulated carrier signal having a central frequency of 8.5 MHz. The modulated carrier signal may be read by means of a pick-up device 3 from a target track on the information-carrying disc 10 which is rotated in a suitable manner by a turn-table (not shown). In this case, the picked-up signal may further contain a frequency component at 7.5 MHz and another component which is introduced from another track neighbouring to the target track due to the cross-talk phenomenon. The frequency component due to the 7.5 MHz signal is introduced from the neighbouring track and is a beat component at a frequency of 1 MHz which corresponds to a cross-talk component appearing in a demodulated signal from the picked-up or read carrier signals.

If, in this instance, the read carrier signal is modulated in frequency by a composite video signal to be reproduced on a two-dimensional displayer such as Braun tube, the frequency modulated carrier signal takes the central frequency of 8.5 MHz so as to represent a gray level and the frequency of 7.5 MHz so as to represent the so-called sync tip level. FIG. 4B shows a single H (horizontal) line period of the composite video signal containing a video information portion representative of a gray picture and two consecutive H sync pulses defining therebetween the video information portion. Since, in this instance, the picked-up signal contains not only the frequency component of 8.5 MHz but also the frequency component of 7.5 MHz, the demodulated composite signal also contains a cross-talk or error component within the video information portion as indicated by a reference character P in FIG. 4B.

Such cross-talk phenomenon mentioned above, takes place when the composite video signal carried on the video carrier signal is read from a non CAV video disc to be rotated at a speed uniformly continuously varied in accordance with the position of the reading spot or detecting point, such as, a CLV video disc in which the 1-H periods corresponding to each other in the respective field periods locate on curved lines 30 shown in FIG. 4C. It can be said that the cross-talk component P is FIG. 1B appearing in the video information portion is caused by the H sync pulse of the neighbouring track. In view of the above-mentioned phenomenon, the Applicant conceived that the cross-talk component may be readily detected only when the video information has a certain constant level such as the gray level. It is now to be noted that the video information portion of several H periods appearing within the vertical blanking period in the composite video signal respectively have a constant gray levels. Therefore, according to the present invention, the cross-talk component in the picked-up information signal such as a composite video signal is detected by separating in frequency the cross-talk component from the carrier signal during predetermined constant frequency sectional periods at which the modulating signal has a certain constant frequency corresponding to a certain level such as the gray level. The constant frequency sectional periods are, for example, several H periods during the vertical blanking periods in the usual composite video signal. Another example of the constant frequency sectional period is a VIRS (vertical interval reference signal) period in another type of video information signal.

Figure 5:
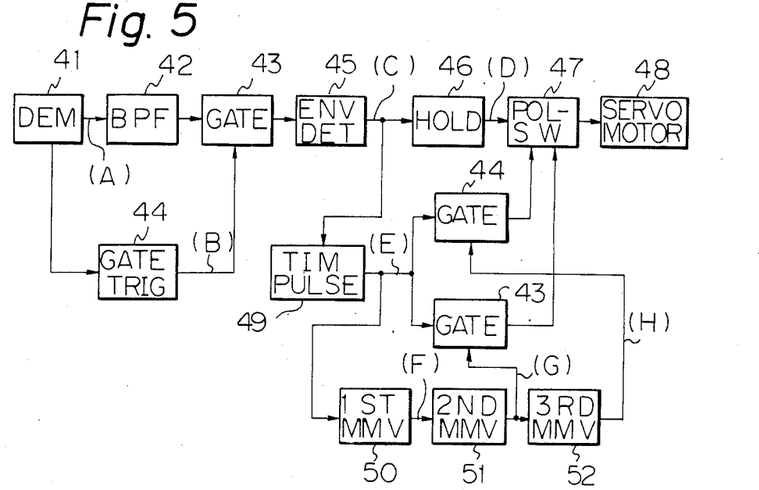
FIG. 5 is a block diagram showing a cross-talk detecting device to be cooperative with a cross-talk eliminating device of the present invention.

In FIG. 5, there is shown a cross-talk detecting device which comprises a demodulator 41 which demodulates a modulated carrier signal read by means of a pick-up means (not shown) from an information-carrying disc (not shown) played in an information-carrying disc player. The demodulated signal (A), which is for example a usual composite video signal, is applied to a band pass filter 42 which separates in frequency a cross-talk component from the composite video signal. The cross-talk component corresponds to a beat frequency between one modulated carrier signal recorded on a target track and the other modulated carrier signal recorded on a neighbouring track. The output signal from the band pass filter 42 is applied to a gate circuit 43 which is triggered to be open by a gate trigger signal (B) from a gate trigger signal generator 44. The gate trigger signal generator 44 may be arranged to count the member of H sync pulses from the beginning of the vertical blanking period and to produce the gate trigger signal appearing at a preselected H-period within the vertical blanking period, the preselected H-period being the above-mentioned constant frequency sectional period. Since, as mentioned above, the gate circuit 43 is open during the constant frequency sectional period, the output signal from the gate circuit 43 contains only the cross-talk component which corresponds to the above-mentioned beat frequency in the modulated carrier signal. The cross-talk component from the gate circuit 43 is applied to an envelope detector 45 which produces an envelope signal of the cross-talk component. The envelope signal is applied to a hold circuit 46 which holds the peak level of the envelope signal (C) until appearance of the succeeding cross-talk component within the succeeding constant frequency period. The output signal (D) from the hold circuit 46 represents the magnitude or amount of the cross-talk component. The output signal from the hold circuit 46, which is a cross-talk amount signal, is applied to a polarity switching circuit 47. The polarity switching circuit 47 is adapted to produce a polarized cross-talk signal having a polarity of either plus or minus according to cross-talk direction signals applied thereto. The polarized cross-talk signal is applied to a servo motor 48 of the cross-talk eliminating system 16 or 16' which adjusts the mechanical relation between the pick-up device 13 and the information-carrying disc 10 so as to eliminate the cross-talk. The rotary shaft (not shown) of the servo motor 48 may be connected by way of a suitable gear train to the gear 20.

The envelope signal (C) is further applied to a timing pulse generator 49 which produces a timing pulse (E) in reponse to the envelope signal (C). The timing pulse represents the appearance of the cross-talk component. The timing pulse (E) is applied to a trigger terminal of a first monostable multivibrator 50 which produces a pulse signal lasting during a predetermined time period. The pulse signal from the first monostable multivibrator 50 causes second and third monostable multivibrators 51 and 52, which are connected to each other in case, to be triggered thereby to produce the respective pulse signals (G, H) having the same pulse width as each other. The pulse signals (G, H) are respectively applied to two gate circuits 43 and 44 which pass therethrough the timing pulse (E) when triggered by the respective pulse signals (G, H). The output signals from the gate circuits 53 and 54 are applied to the polarity switching circuit 47 as the cross-talk direction signals.

The operation of the above-mentioned cross-talk detecting device of FIG. 5 will be explained in more detail while referring to FIGS. 6A through 6H.

Figure 6A:
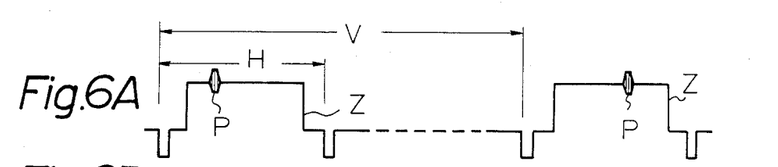
Figures 6B, 6C, 6D:
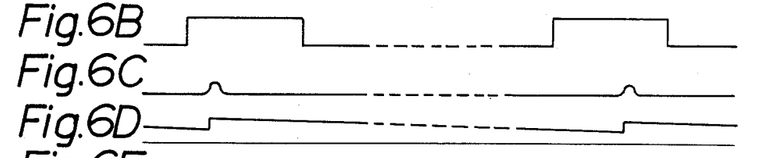
Figures 6F, 6G:
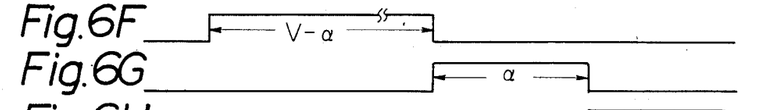
Figure 6H:
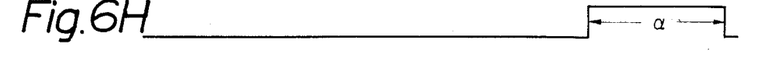

When the demodulated signal (A) produced from the demodulator 41 is a composite video signal, the demodulated signal (A) contains a vertical period V corresponding to a single "field" and constituted by a plurality of H periods as shown in FIG. 6A. One of the H periods within the vertical blanking period is selected to be the constant frequency sectional period which is indicated by Z in FIG. 6A. Every vertical blanking period may contain a single constant frequency sectional period but, in some cases, may contain several ones if preferred. Furthermore, only alternate vertical blanking periods may contain the constant frequency sectional periods. As being shown in FIG. 6A, the constant frequency period Z contains the cross-talk component P. Since the gate circuit 43 is triggered by the gate trigger signal having such a waveform as shown in FIG. 6B, the envelope detector 45 produces envelope signal having such a waveform as shown in FIG. 6C. The peak level of the envelope signal is held by the hold circuit 46 which produces the output signal (D) having such a waveform as shown in FIG. 6D. On the other hand, the timing pulse generator 49 produces the timing pulse (E) having such waveform as shown in FIG. 6E. Thus, the first monostable multivibrator 10 produces the pulse signal (F) having such a pulse width of V— as shown in FIG. 6F. The period is preferably selected to be generally or approximately equal to 1-H time period. The second monostable multivibrator 51 is triggered at the trailing edge of the pulse signal (F) so as to produce the pulse signal (G) having a pulse width of as shown in FIG. 3G. The third monostable multivibrator 52 is triggered at the trailing edge of the pulse signal (G) so as to produce the pulse signal (H) having a pulse width of as shown in FIG. 6H. These pulse signal (G) and (H) are respectively applied to the gate circuits 43 and 44 either one of which passes therethrough the timing pulse signal (E) in response to the pulse signal (G) and (H).

The timing pulse generator 49, the first through third monostable multivibrator 50 through 52 and gate circuits 43 and 44 cooperate with each other as a cross-talk direction detecting circuit which compares a time period between the two consecutive timing pulse signal (E) with the repetition period of the constant frequency sectional periods, which is equal to a single vertical period V, so as to produce the cross-talk direction signal indicating the cross-talk direction, that is, from inside track to outside track or vice versa. It is to be noted that the term "cross-talk direction" means a radial direction in which there exists a track neighbouring to the target track and carrying therein information causing the appearance of the cross-talk component, that is, an error component.

The reason why the above-mentioned cross-talk direction detecting circuit can detect the cross-talk direction in which the cross-talk takes place will be explained hereinbelow.

When cross-talk phenomenon takes place during reproduction of a non-CAV disc such as a CLV disc or such a disc as shown in FIG. 4C, such cross-talk as shown in FIG. 4B takes place, in which cross-talk component corresponding to the H sync pulse in the neighbouring track appears in the constant frequency H period. As seen from FIG. 4C, the relative position of two adjacent H period on the neighbouring tracks offset from each other in the radial direction of the disc. Therefore, a time period from one cross-talk component in one constant frequency H period to another cross-talk component in another constant frequency H period succeeding to the one constant frequency H period is longer or shorter than the repetition period of the constant frequency H periods in accordance with the direction of the cross-talk. It is therefore possible to detect the cross-talk direction by comparing the time period between the two consecutive cross-talk components with the repetition period of the constant frequency sectional periods.

Figure 7:
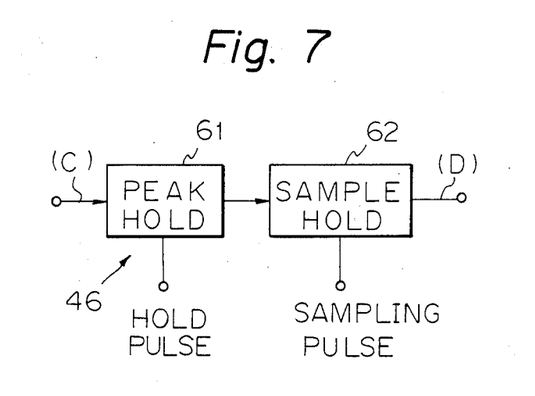
FIG. 7 is a block diagram showing an example of a part of the device shown in FIG. 2.

In FIG. 7, there is shown a circuit arrangement of the hold circuit 46 of FIG. 2. The hold circuit 46 shown in FIG. 7 includes a peak hold circuit 61 which holds peak level of the envelope signal (C) during appearance of a hold pulse. The output signal from the peak hold circuit is sampled by a sample hold circuit 62 during appearance of a sampling pulse. The peak hold circuit 61 is adapted to be reset at the trailing edge of each hold pulse thereby to prepare to hold the next envelope signal. The sampling pulse can be obtained by wave-shaping the envelope signal (C) and the sample hold circuit 62 is triggered by the trailing edge of the sampling pulse thereby to renew the output signal (D). The sample hold circuit 62 is adapted to discharge the sampled peak level at a predetermined time constant thereby to cease to produce the output signal (D) after the lapse of a predetermined time period from the appearance of the cross-talk component.

It is to be understood that the H sync pulse period may be selected as the above-mentioned constant frequency sectional periods. In this case, the luminous information component on the neighbouring track which has entered into the H sync pulse period is detected as the cross-talk component. This method for detecting the cross-talk component within the H sync pulse period can provide more precise detection of the cross-talk.

Figure 8:
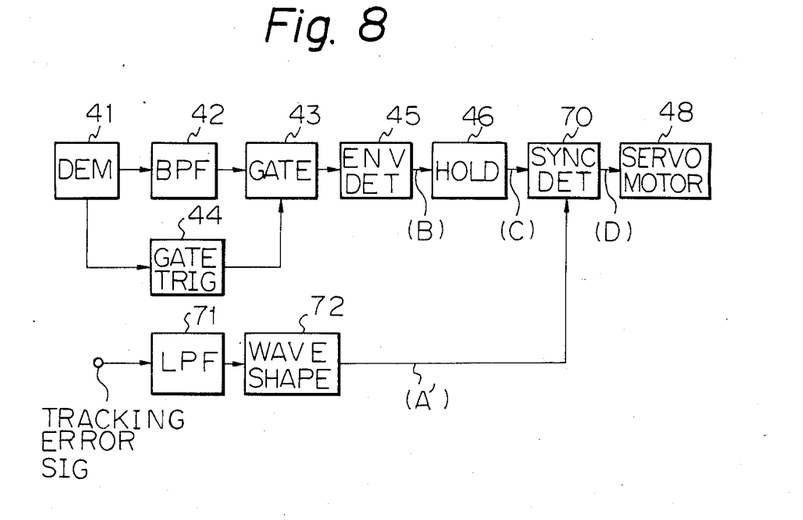
FIG. 8 is a block diagram showing another example of the cross-talk detecting device to be cooperative with the cross-talk eliminating device according to the present invention.

In FIG. 8, there is shown another cross-talk detecting device which has the same construction as that of FIG. 5 except that the gate trigger signal generator 44 is adapted to produce a gate trigger signal which is synchronous to the H sync pulse and the gate circuit 43 passes therethrough only the H sync pulse periods of the composite video signal. Further, the polarity switching circuit 47 is substituted for a synchronous detector 70 which is arranged to mix a d-c component of the signal (C) with a low frequency component signal (A') of, for example, 30 Hz contained in a tracking error signal and passed through a low pass filter 71 and a wave shaper 72.

The tracking error signal is produced in a tracking servo system (not shown) which is necessarily equipped with the information-carrying disc player in order to perform the tracing of the pick-up spot on a target track on the information-carrying disc.

Referring now to FIGS. 9A through 10D, the operation of the cross-talk detecting device will be explained in more detail hereinbelow.

Figure 9A:
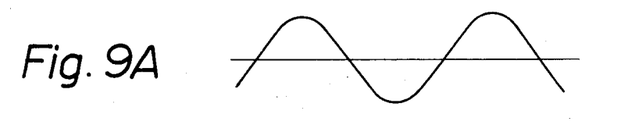
FIGS. 9A through 9D and 10A through 10D are diagrams respectively showing waveforms appearing in the device of FIG. 8.
Figure 9B:
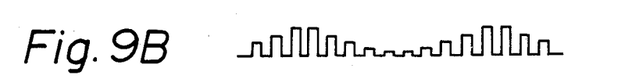
Figure 9C:
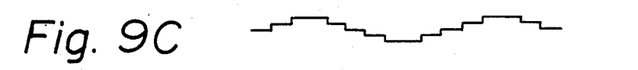
Figure 9D:
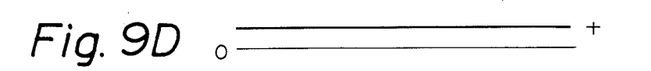

When the low frequency component signal (A') has such a waveform as shown in FIG. 9A, the envelope signal (B) from the envelope detector 45 has such a waveform as shown in FIG. 9B, the envelope signal (B) being representative of the cross-talk components respectively appearing in the H sync periods. Therefore, the output signal from the hold circuit 46 has such a waveform as shown in FIG. 9C. It is, in this instance, assumed that the cross-talk takes place in one direction of, for example, from inside to outside. The output signal from the synchronous detector 70 has such a constant plus level as shown in FIG. 9D.

Figure 10A:
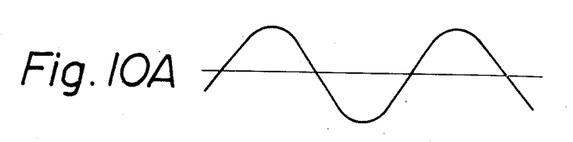
Figure 10B:
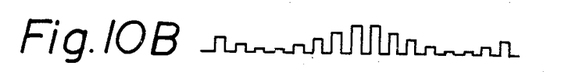
Figure 10C:
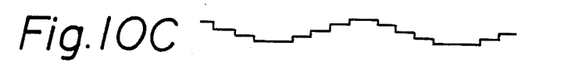
Figure 10D:
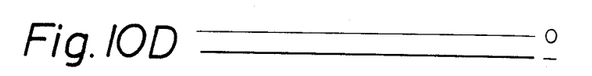

When, on the other hand, the cross-talk takes place in the reverse direction of, for example, from outside to inside, the output signal of the envelope detector 45 has such a waveform as shown in FIG. 10B while the low frequency component signal has such a waveform as shown in FIG. 10A. The envelope signal (B) is held by the hold circuit 46 which produces an output signal having such a waveform as shown in FIG. 10C. The low frequency component signal of FIG. 10A and the output signal of FIG. 10C are applied to the synchronous detector 70 which produces such a dc voltage of minus level as shown FIG. 10D.

It is now apparent that the cross-talk signal produced from the synchronous detector 70 of the cross-talk detecting device of FIG. 8 has a voltage level representative of the amount of the cross-talk and a polarity representative of the direction of the cross-talk.

Figure 11:
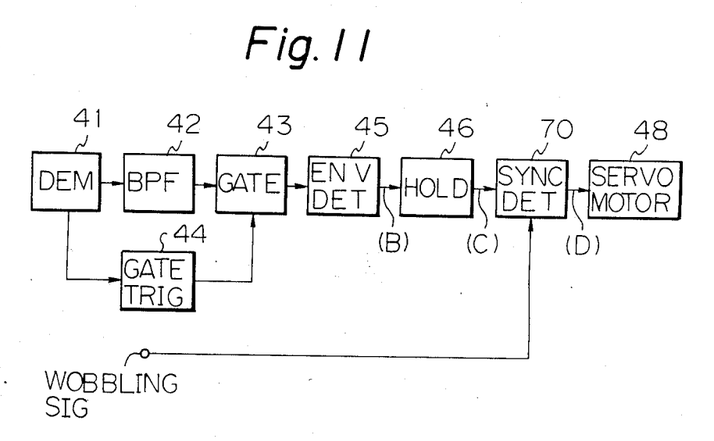
FIG. 11 is a block diagram showing still another example of the cross-talk detecting device to be cooperative with the cross-talk eliminating device according to the present invention.

In FIG. 11, there is shown another cross-talk detecting device, which has the same construction as that of FIG. 8 except that a wobbling signal is supplied to the synchronous detector 70 instead of the low frequency component of the tracking error signal. The wobbling signal is to be superposed on the tracking error signal so as to wobble the pick-up device at a relatively low frequency of, for example, about 30 Hz thereby perform desired tracking servo control.

The operation of the cross-talk eliminating device of FIG. 11 is generally the same as that of FIG. 8.

It will be understood that the invention is not to be limited to the exact construction shown and described and that various changes and modifications may made without departing from the spirit and scope of the invention, as defined in the appended claims.

What is claimed is:

1. In an optical information-carrying disc player for reading an information carrier signal optically recorded on an information-carrying disc in the form of one or more spiral or annular tracks, which includes a disc support means for supporting said disc and rotating said disc at a speed, and pick-up carrier placed in the proximity of said disc having therein a pick-up device for producing a focussed light beam while deflecting the light beam under a tracking servo control so as to align said light beam onto a target track of said disc thereby to read said information carrier signal from said target track, the improvement which comprises:
   a cross-talk eliminating means mechanically connected to at least either one of said disc support means and said pick-up carrier, for adjusting the angle of inclination of said pick-up carrier with respect to the axis of rotation of said information-carrying disc.

2. A disc player as claimed in claim 1 wherein said cross-talk eliminating means tilts said pick-up carrier and changes the angle of inclination of an optical axis of said focussed light beam, produced by said pick-up device in said pick-up carrier, with respect to said axis of rotation of said information-carrying disc.

3. In an information-carrying disc player for reading an information carrier signal optically recorded on an information-carrying disc in the form of one or more spiral or annular tracks, said information carrier signal being modulated in frequency by a video modulating signal containing successively appearing constant frequency sections at which the frequency thereof is constant, which includes a disc support means for supporting said disc and rotating said disc at an angular velocity which is uniformly continuously variable with the radial position of the detected point on said disc, and a pick-up carrier placed in the proximity of said disc and having a pick-up device for producing a light beam while deflecting the light beam under tracking servo control so as to align said light beam onto a target track of said disc thereby to read said information carrier signal from said target track, the improvement which comprises:
   demodulating means coupled to said pick-up device for demodulating the read carrier signal into said video modulating signal;
   filter means, coupled to said demodulating means, for receivng said video modulating signal and passing an error component of said video modulating signal having a frequency within a predetermined frequency range;
   gate trigger signal generating means, coupled to said demodulating means, for producing a gate trigger signal during each of said constant frequency sections of said video modulating signal;
   gate means controlled by said gate trigger signal generating means and coupled to said filter means for opening its gate in response to said gate trigger signal so as to pass therethrough said error component;

signal producing means coupled to said gate means for producing an error signal representative of the magnitude of said error component received thereby; and cross-talk eliminating means mechanically connected to at least either one of said disc support means and said pick-up carrier for adjusting the angle of inclination of said pick-up carrier with respect to axis of rotation of said information-carrying disc in response to said error signal.

4. The information-carrying disc player as defined in claim 3, in which said signal producing means includes an envelope detector coupled to said gate means for detecting the envelope of said error component so as to produce an envelope signal as said error signal.

5. The information-carrying disc player as defined by claim 3, in which said modulating signal is a video signal containing therein periodically appearing horizontal blanking periods, and said constant frequency sections are contained in all or selected ones of the vertical blanking periods.

6. The information-carrying disc player as defined in claim 3, in which said constant frequency sections appear periodically with a certain repetition period, and which further comprises:

error direction detecting means connected to said signal producing means, for producing an error direction signal representative of a radial direction in which there exists a track neighbouring to said target track and carrying information causing the appearance of said error component.

7. The information-carrying disc player as defined in claim 6, in which said error direction detecting means includes:

a timing pulse generator coupled to said signal producing means for generating a timing pulse at each time when said error signal appears;

a first gate trigger pulse generator connected to said timing pulse generator, for generating a first gate trigger pulse lasting from the appearance of said timing pulse during a time period substantially equal to said repetition period;

a second gate trigger pulse generator connected to said first gate trigger pulse generator for generating a second gate trigger pulse during a time period equal to generally one-half of a time period during which each of said constant frequency sections lasts;

a first gating means receiving and passing therethrough said timing pulse as a first polarity command signal in response to said first gate trigger pulse;

a second gating means receiving and passing therethrough said timing pulse as a second polarity command signal in response to said second gate trigger pulse;

a hold circuit coupled to said signal producing means for holding a peak level of said error signal; and a polarity switching circuit coupled to said hold circuit for producing a polarized error signal having a magnitude corresponding to the magnitude of said error signal and either one of plus and minus polarities in accordance with said first and second polarity command signals.

* * * * *